Figure 1:
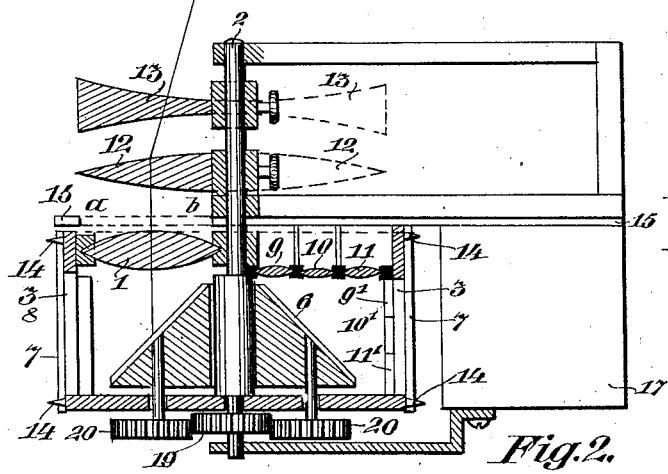

J. SZCZEPANIK.
CINEMATOGRAPH.
APPLICATION FILED JUNE 28, 1920.

1,423,697.

Patented July 25, 1922.
6 SHEETS—SHEET 1.

Inventor.
Jan Szczepanik.
By B. Singer. Atty.

J. SZCZEPANIK.
CINEMATOGRAPH.
APPLICATION FILED JUNE 28, 1920.

1,423,697.

Patented July 25, 1922.

6 SHEETS—SHEET 2.

Inventor
Jan Szczepanik,
By B. Singer,
atty.

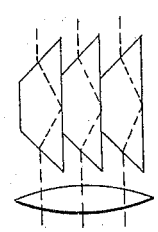
Fig.8.
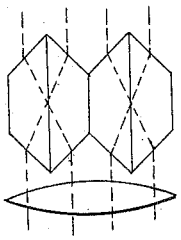
Fig.9.
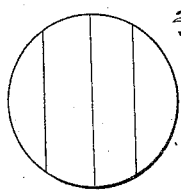
Fig.10.
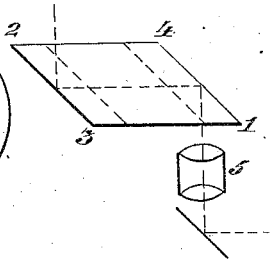
Fig.11.
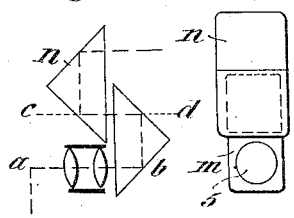
Fig.12. Fig.13.
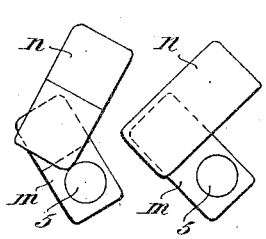
Fig.14. Fig.15. Fig.16.
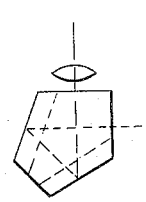
Fig.17.
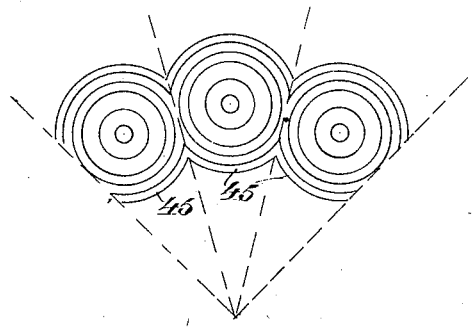
Fig.20.

J. SZCZEPANIK.
CINEMATOGRAPH.
APPLICATION FILED JUNE 28, 1920.

1,423,697.

Patented July 25, 1922.
6 SHEETS—SHEET 4.

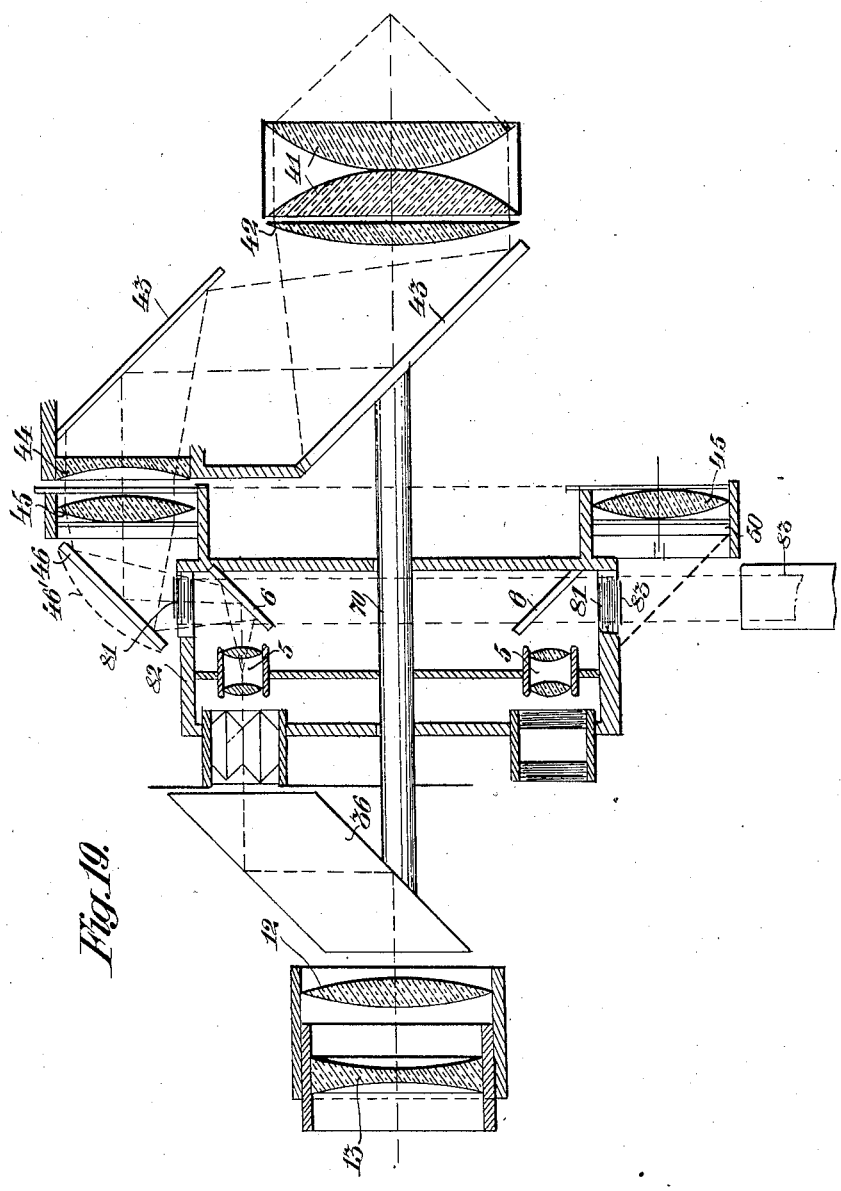

J. SZCZEPANIK.
CINEMATOGRAPH.
APPLICATION FILED JUNE 28, 1920.

1,423,697.

Patented July 25, 1922.
6 SHEETS—SHEET 6.

UNITED STATES PATENT OFFICE.

JAN SZCZEPANIK, OF TARNOW, POLAND.

CINEMATOGRAPH.

1,423,697. Specification of Letters Patent. Patented July 25, 1922.

Application filed June 28, 1920. Serial No. 392,446.

*To all whom it may concern:*

Be it known that I, JAN SZCZEPANIK, a citizen of Poland, residing at Tarnow, Poland, have invented a new and useful Cinematograph, for which I have filed applications for patent in Austria, A–4689/18, filed August 19, 1918, and A–2521/19, filed July 19, 1919, and in Germany, S–49077 VI/57a2, filed October 11, 1918, and of which the following is a specification.

The invention relates to a cinematograph, in which a long portion of the picture band or film, said portion comprising a large number of picture fields, is curved according to a cylindrical surface. But an equivalent of the curvature according to a cylindrical face, is an arrangement in which the picture film is bent corresponding to the periphery of prism provided with equal sides.

In the said cylinder is arranged a ring or crown of mirror reflecting elements which guide the incident light, passing in the direction of the axis of the cylinder, in the case of taking and the reflected light in the case of reproducing, to the picture band or the picture screen respectively, each of the reflectors acting on one of the picture fields.

Now, the several mirror reflecting elements should enter in action individually or in groups, one after the other and besides the picture band should be fed uninterruptedly anew. Both of these proceedings may take place in one or other of the two following ways:

(*a*) The cameras and the cylinder for the picture band may be in a fixed position and the picture band may slide around the cylinder, whilst the feeding and winding up drums for the picture band revolve. An opening or a window revolving therewith simultaneously releases the several cameras for illuminating.

(*b*) The ring or crown of cameras revolves with the picture band cylinder about the axis of the latter and the picture band will be carried with the cylinder in known manner. In such case the free opening in front of the objectives acting as a shutter is in a fixed position, so that each of the cameras enters in action once during a full revolution.

In both cases means should be provided, in order to obviate the parallactic errors, and to effect the erection of the image.

Figure 4:
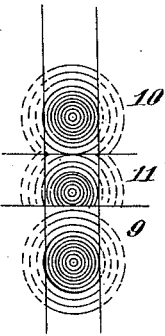
Figure 2:
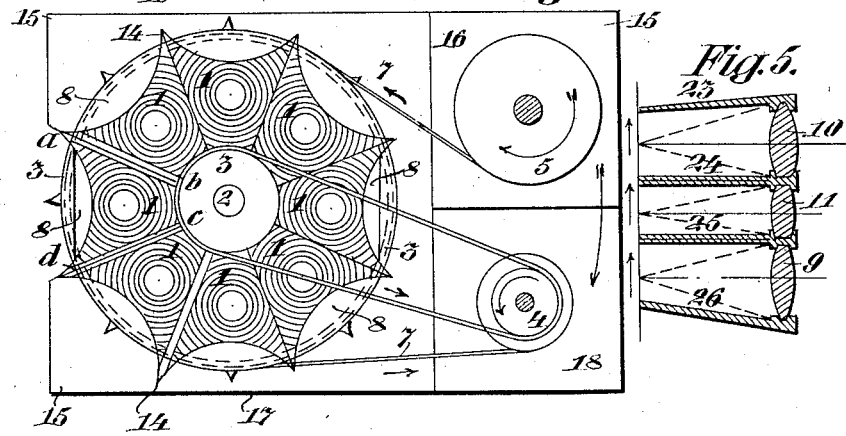
Figure 5:
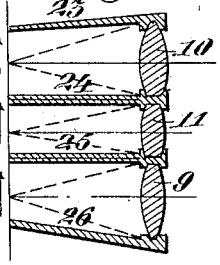
Figure 3:
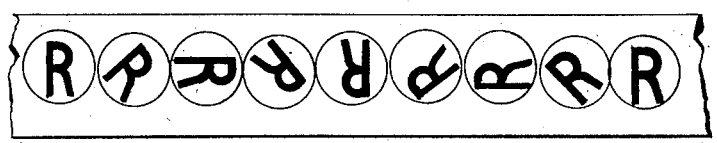
Figure 6:
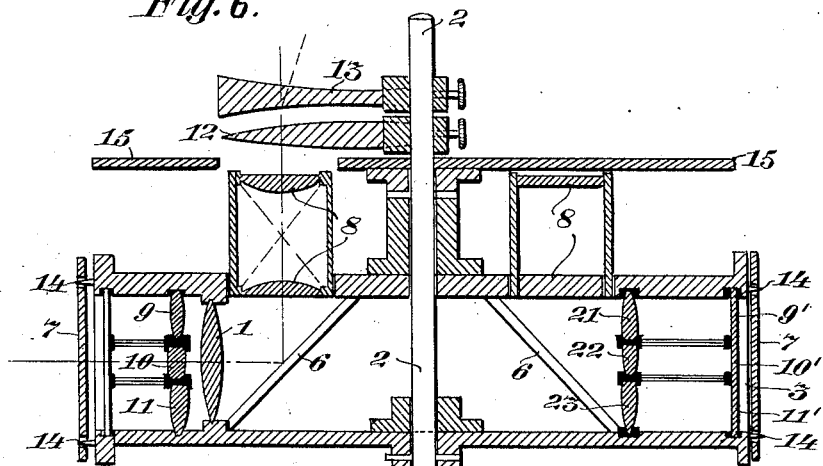
Figure 7:
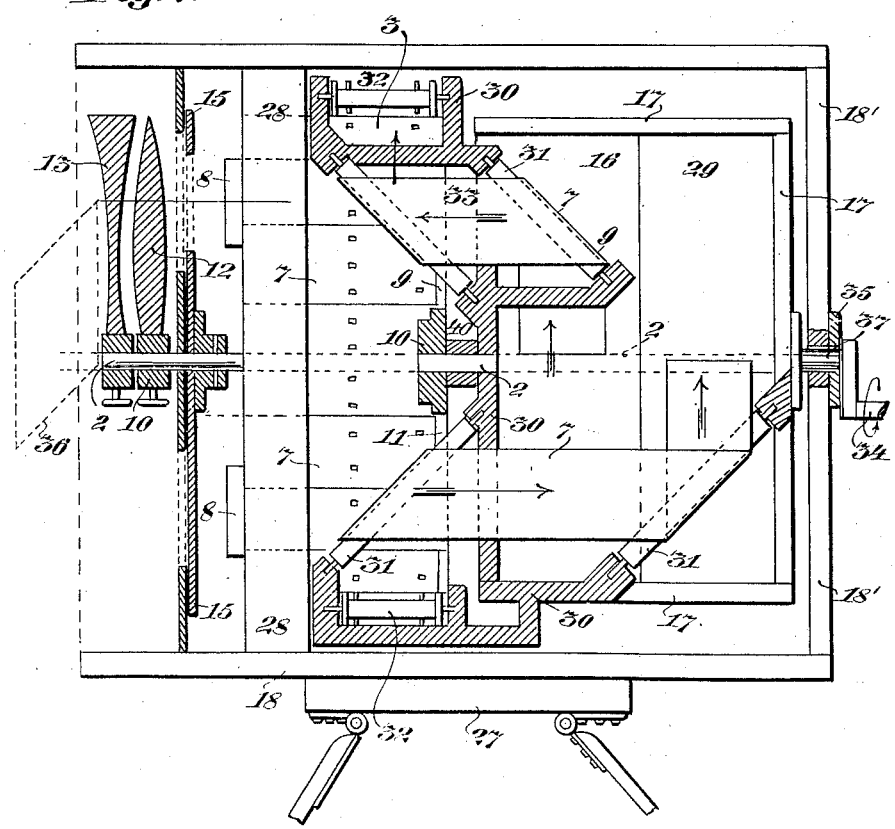
Figure 18:
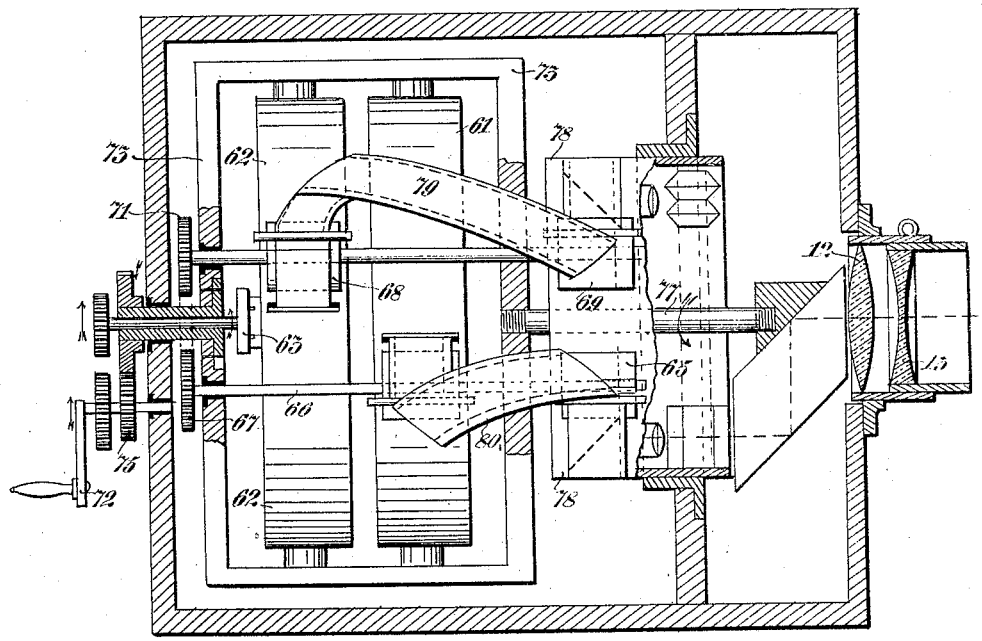

The invention is illustrated in the annexed drawings. Fig. 1 shows a sectional view of an embodiment of the invention. Fig. 2 is a side elevation, Figs. 3, 4 and 5 show the manner of producing the image and the path of the rays. Figs. 8–15 show different forms of prisms for erecting the image. Fig. 6 illustrates diagrammatically two further modified forms. Figs. 7 and 18 show a taking apparatus according to Fig. 6 in a side view and illustrate by way of example two forms of the arrangement for feeding the picture band. Figs. 16 and 17 show two image erecting prisms. Figs. 19–22 show two further forms of the projecting apparatus.

In Figs. 1, 2, 6, 7, 18, 19 and 21 a plurality of cameras are arranged about the shaft 2 symmetrically and in such manner that the images produced by the objectives 1 are projected upon a cylindrical or polygonal drum 3 provided with glass windows or consisting of glass.

The cameras with the objectives 1 being grouped in Fig. 1 about the shaft 2, reflect all images by means of mirrors 6 upon the wall of the drum 3, whereby the entire arrangement of Fig. 1 may be considered as being composed of mirror reflecting cameras separated by thin partitions. The mirrors 6 may also be arranged in a somewhat larger distance from the objective, whereby the picture band drum will be reduced.

If a cylindrical drum such as illustrated partially in Fig. 2 is used, there is interposed in front of each picture field, a cylindrical lens 8 for the purpose of balancing the focal difference and of maintaining sharply defined images on the picture band 7 wound upon the drum 3. The objectives 1 in Figs. 1 and 2 are directed towards the objects to be exposed or to be taken up either directly or by means of the mirrors 6 as shown in Fig. 6.

Instead of a simple camera three colour cameras may be used, which are provided with one or more objectives, as is represented in Fig. 1 by the three lenses 9, 10, 11 the known colour filters, as for example at 9′, 10′, 11′ (Fig. 1) being interposed in the path of the rays of the three colour cameras in front of or behind the objective.

In front of the objective 1 and in coaxial relation to the entire system of cameras there is arranged a positive lens 12 composing a lens system, the focal distance of which preferably by arranging in front of such system an additional negative lens 13 may be increased in such manner that the object to be taken up is positioned in focal distance, so that the rays between the lens 12 and the objectives 1 or 9, 10, 11 are parallel. The portions of the picture band lying on the drum 3 then should be at a distance from the objectives 1 or 9, 10, 11 respectively, which distance is equal to the focal distance of such objectives. By the entire arrangement of lenses 12 and 13 in front of the system the main rays of all objectives 1 will be deflected as is known to the centre lying in the shaft or axis 2, whereby the parallactic error being unavoidable otherwise, is removed. If now the film band 7 is wound around the drum 3, which may be provided with pins 14, as many identical simple or three colour exposures can be performed by such an arrangement as corresponds to the number of cameras being present, but the images taken up are shifted or turned relatively to each other, as is represented by the letter "R" which may be considered as the image. Serial exposures may be effected by the arrangement shown in Fig. 1 is such manner that the objectives are opened consecutively by a revoluble shutter or blind 15 (Figs. 1 and 2) a sector like portion (a, b, Fig. 1 and a, b, c, d, Fig. 2) of the same being cut out.

By revolving such sector blind 15 in front of the fixed camera drum the two picture band boxes are revolved therewith about the drum 3, whereby as is seen from Fig. 2, the picture band 7 is unwound from the stock box 16 or from the roller 5, then carried over the drum 3, and the already exposed portion of the picture band is wound on the roller 4 in the receiving box 18.

The picture band 7 remains thereby perfectly in a fixed position in front of and in relation to the illuminated or projecting camera, during a longer period of time than the period of illumination although the picture band is moved continuously in the apparatus.

In the form shown in Fig. 1 and provided with the fixed drum, the apparatus is adapted without change for exposing and reproducing, the individual images which according to Fig. 3, during the process of taking or exposing are turned, will be returned during reproduction.

Yet the form hereinbefore described has the drawback that only circular images immediately lying side by side are allowed to be arranged, whereas the rectangular images and the cameras associated thereto must be arranged correspondingly at larger distances apart on the drum which would result in a greater picture band consumption. This drawback may be obviated in such manner that prisms are arranged in front of the objectives 1, said prisms being correspondingly revolved, to shift the images, so that they are parallel to each other.

For example, as known Amici prisms and bifocal cylinder lenses, which by may of example are represented by 8 in Fig. 6, may be used for shifting or erecting the images. The apparatus may be used also for series expositions in such way that the sector blind 15 and picture band boxes 16, 18 remain stationary, whereas the entire drum being permanently clothed with or fed by the picture band revolves, and at the same time the drum allows the already illuminated portion of the picture band to enter the picture band 7 box by means of known winding means. In such form the erecting members, such as straight sight Amici prisms or bifocal cylinder lenses (Fig. 6), double revolving the image should be returned by means of a suitable gearing, for example gear wheels with such an angular velocity that the individual images always are maintained exactly in their positions. The image revolutions in the individual cameras taking place during the revolution of the drum, may be cancelled in the simplest manner by providing that the mirrors 6 (of elliptical form) in Fig. 1 are turned back at the same velocity as the drum itself. This may be effected in the simplest manner as illustrated in Fig. 1 by means of gear wheels 20 engaging the fixed gear wheel 19.

In Fig. 6 the mirror is mounted in front of the objective 1. The lenses 9, 10, 11 being arranged behind the objective 1 divide the cone of rays of the objective into three portions and deflect the same partially, whereby in lieu of a single image three images are produced simultaneously, which are separated from each other by thin partitions or diaphragms.

But in equivalency thereto three images may be obtained without the objective 1, if in lieu of the latter three lenses or small objectives are used, as is represented in Fig. 6 by the lenses 21, 22, 23 which are arranged in front of the filters 9', 10', 11'.

In order to obtain at the simultaneous exposition equally covered images it is advisable instead of shading the filter by darkening, to employ objectives of different diameters or apertures, or to cut lenses of the same size so that they acquire the corresponding power of illumination, as is represented in Figs. 4 and 5. In spite of different size the three objectives may project images of equal size, if the partitions 23, 24, 25 and 26 are displaced correspondingly as shown in Fig. 5.

Fig. 7 is a side elevation and partly a sectional view of the parts shown in Fig. 6, in order to clearly show the way of the picture band 7. Upon the head 27 of a stand is mounted a case 18' provided with a partition 28, which together with the camera drum and image erecting device is mounted in such manner that the portion to be clothed or fed by the picture band projects freely. In the rear of the drum a receptacle 17 is arranged in the case 18', said receptacle serving to enclose the feeding box 16 and the film winding or receiving box 29. The receptacle 17 is mounted by the trunnions 37 in a bearing 35 so as to be capable of revolving about the shaft 2 which is secured to the drum.

On the receptacle 17 a suitably shaped metal piece 30 is secured, which is provided with four rollers 31, over which the picture band 7 passes, and with two thrust rollers 32, which press the band 7 toward the drum 3.

If now the receptacle 17 and the film boxes are revolved in the direction of the arrow (Fig. 7) for example by means of a hand crank 34, the picture band will be continuously wound on the drum and again unwound therefrom and then wound up by a known winding up device (not shown) in the box 29. The path of the picture band is represented in Fig. 7 by arrows. On the shaft 2 revolving therewith the circular blind 15 having a sectorlike cut out portion $a, b, c, d$, and the lens sectors 12, 13 rotating with the blind 15, are secured, whereby the expensive large achromatic lenses are dispensed with. In lieu of the lens sectors two mirrors or a corresponding prism 36 may be used as indicated by dotted lines in Fig. 7, and in front of such mirrors or prism the positive and negative correcting lenses 12 or 13 respectively may be interposed.

The three colour cinematography may also be performed in such manner that in front or in the rear of the simple objectives (Figs. 1 and 6) the filters for red, green and blue will be interposed alternately, but in this case the number of objectives should be a multiple of the number "3" and the sector blind may then comprise preferably simultaneously two or three objectives, whereby the coloured contours of the moving portions of the image will be repressed nearly completely during the projection and the exposition will be extended.

The cylindrical bifocal lenses designed for the purpose of erecting the images as well as the erecting prisms may be used on account of their extended size only with objectives being at a large distance apart from each other, which causes a large picture band waste or loss. This drawback may be obviated in such manner that in lieu of one long erecting member is used a plurality of shorter erecting members.

In Fig. 8 as an example three and in Fig. 9 four Dove's prisms shown in a sectional view are used. Fig. 10 shows the erecting prisms represented in Fig. 9 in elevation. By revolving one of such erecting systems according to Fig. 8 or 9 the image will be revolved with double the angular velocity as is the case with a simple erecting prism. In Figs. 18 and 19 such erecting prisms being arranged in front of the objectives are represented.

The erecting of the image may also be effected by all known prisms having one, two or more reflecting surfaces, provided all or a portion of the reflecting surfaces have sloping or shed like edges, which may be revolved so as to occupy different angular positions. For example the prism 1, 2, 3, 4 in Fig. 11 may be used to erect the image, when the shed edge 2, 3 is turned for example to the left and the shed edge 1, 4 to the right. The angle of revolution being restricted, the images may be erected only in a restricted extent by means of prisms according to Fig. 11 and only to such a degree that while all of them as rectangles lie in juxtaposition, the images of the one half of the objectives are upright whereas those of the other half appear to be shifted by an angle of 180°. But in case two kinds of prisms with shed edges are used, and one half of them having an even and the other half an odd number of reflecting surfaces, all of the images may be equipositioned and erected, as for example may be effected by the shed edge prisms according to Fig. 16 (Amici) and to Fig. 17 (Penta).

In lieu of shed edge prisms which are difficult to manufacture with the required exactness, arrangements of prisms as shown in Figs. 12–15 (Porro) may be used preferably. If one of the prisms in Fig. 12 is being revolved about the axis $c, d$, the image will be revolved with double the angular velocity. In Fig. 13 the prisms shown in Fig. 12 are illustrated in front view. The prism $n$ in Fig. 13 may be revolved to the left and right by an angle of 90° in each direction, i. e., totally by an angle of 180°, whereby the required revolution of image from 0°–360° will be effected. Such for example the prism in Fig. 14 revolves by 120° and the prism in Fig. 15 by 180°.

If two prisms $m$ and $n$ of this kind are revolved in respect to each other by a certain angle and then connected or cemented so as to form a single body, they may be not only revolved about the axis $a$—$b$ but anywise and also shifted partially, this does not influence the image erecting. It results therefrom that such pairs of prisms being arranged at different angles in relation to each other may be easily mounted in front of the objectives and enable the manufacturing of apparatuses corresponding to each other without special adjustment.

The image erecting prisms, instead of being arranged in front of the objectives, may also be disposed behind the same, as for example prisms according to Figs. 16 and 17, that is between the picture band and the objective. When using prisms behind the objectives certain astigmatic and chromatic operations take place, so that special objectives must be used, which eliminate the said fault. Finally the image erecting members may be arranged in front of and behind the objective, said members acting additively and subtractively upon the revolution of the images. They may be equivalent or different for example they may consist in the half of the system of members according to Fig. 16 and in the other half of members according to Fig. 17, or else for example of shed prisms of the type Abbe and Sprenger or of prisms according to Fig. 11 or the like.

Instead of conveying the film positively over rollers in connection with taking up apparatus, as is represented in Fig. 7, the picture band may be guided preferably by means of mechanically moved pin wheels, between which on each change of direction of moving the picture band forms freely floating loops. A construction of this kind is shown in Fig. 18. The unilluminated film will be drawn from the box 61 and then delivered to the winding box 62 containing a winding wheel 63. The pin wheels 64 and 65 mounted together with the gear wheel 67 on the shaft 66 serve for feeding the picture band, whereas the pin wheels 68, 69 being mounted on the shaft 70 with the pinion 71 serve for conveying the picture band into the winding box 62. By revolving the crank 72 the frame 73 is rotated by the wheels 74 and 75, on the hollow shaft 76 and the shaft 77, whereby the wheels 67 and 71 engaging a pinion (not shown) are rotated, and the film by the revolution of the boxes 61 and 62 permanently clothes the picture band drum 78 and the picture band forming freely floating loops 79 and 80 will be wound up and unwound without any injurious strain, so that the picture band is prevented from twisting or breaking.

In the apparatus for reproducing, an equivalent illumination of the images being arranged on the periphery of a drum may be produced most conveniently in such manner that rays starting from a correspondingly intensive source of light are divided by suitable optical means into a number of individual pencils of rays and reflected into the three colour filters, the pencils of rays being forced to intersect each other within the objective. An arrangement of this kind is shown in Figs. 19–22, the objectives 5 with mirrors 6 as a projecting apparatus being arranged symmetrically around the shaft 70.

The cylindrical lenses form together with the drum a support for the picture band. The lenses 12 and 13 constitute a tele-objective, between which the prism 36 rotating on shaft 70 reflects the rays in succession to the objectives 5.

The mirror system 43 also rotating with the shaft 70 or a illuminating prism will be revolved in synchronism with the revolution of the prism 36, so that the rays starting in parallel from the condenser 41 will be cast in succession upon the fixed crown of twelve condensers 45, which unite the rays by means of mirrors 46 through the diapositive picture band 83 and cylindrical lenses 81 in the objectives 5.

The auxiliary condensers 45 are cut according to Fig. 20 and juxtaposed, so that no loss of light can take place. The condenser 41 and the pair of illuminating mirrors 43 should be proportioned so that the parallel rays illuminate at the same time three auxiliary condensers 45 and therefore at the same time three three-colour filters. The diameter of the condensers 41 in this case should be accordingly more than three times larger than the auxiliary condenser 45, whereby the rays also pass above and below the auxiliary condenser 45, which would cause a very considerable loss of light. This drawback may be obviated in the following manners:

(a). The rays departing from a large condenser 41 (Fig. 19) will be collected in one direction by a convex cylindrical lens 42, and after having been discharged from the pair of illuminating mirrors 43, again directed so as to run parallel by means of a concave cylindrical lens 44, as shown in Fig. 19.

(b). A small condenser 41 (Fig. 21) will be used, and in lieu of 42 a concave cylindrical lens 45 being shifted by an angle of 90° and dispersing the rays in the direction of width, and in lieu of 44 a concave cylindrical lens is placed, the latter lens being arranged parallel with the lens 42.

In both cases the rays meet parallel the auxiliary condensers 45.

The mirrors 46 (Figs. 19 and 21) being inclined by an angle of 45° prevent the drum 82 (Fig. 19) from being clothed by the picture band 83, and they should be shifted together with the auxiliary condenser 45 for example in the direction of the arrow o (Fig. 19 at the bottom) while the drum is being clothed. But this may be obviated by using instead of twelve mirrors 46 a spherical, toric mirror 46' or a cone shaped mirror which embraces 3–4 images and revolves simultaneously with the shaft 70, prisms or mirrors 43 and 46.

But the cones of rays leaving the auxiliary condensers 45 (Fig. 19), which rays are to be collected, will be deformed by the cylindrical lens 81 and partially by the cone mirror 46, however the said deformation may be obviated by interposing in front of them an inclined or correspondingly deformed cylindrical correcting lens 50 which acts in opposite direction but equivalently.

With an arrangement of this kind three colour images are projected at a time and thereupon, i. e., on the next projection the first of these three images is taken away and a new image is added adjacent to the image which was the last one of the three images being projected previously. For example after projecting the first three images No. 1 (red), No. 2 (green), No. 3 (blue) the next projection consists in No. 2 (green), No. 3 (blue), No. 4 (red), thereupon No. 3 (blue), No. 4 (red), No. 5 (green) and so on.

Figure 22:
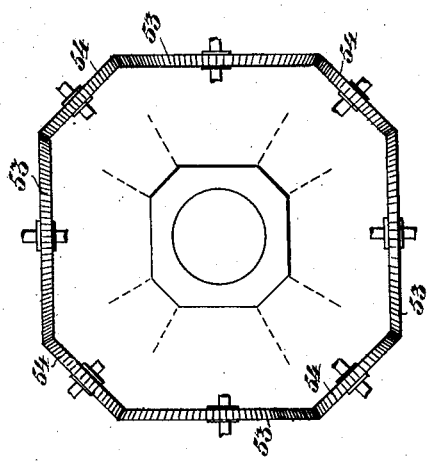
Figure 21:
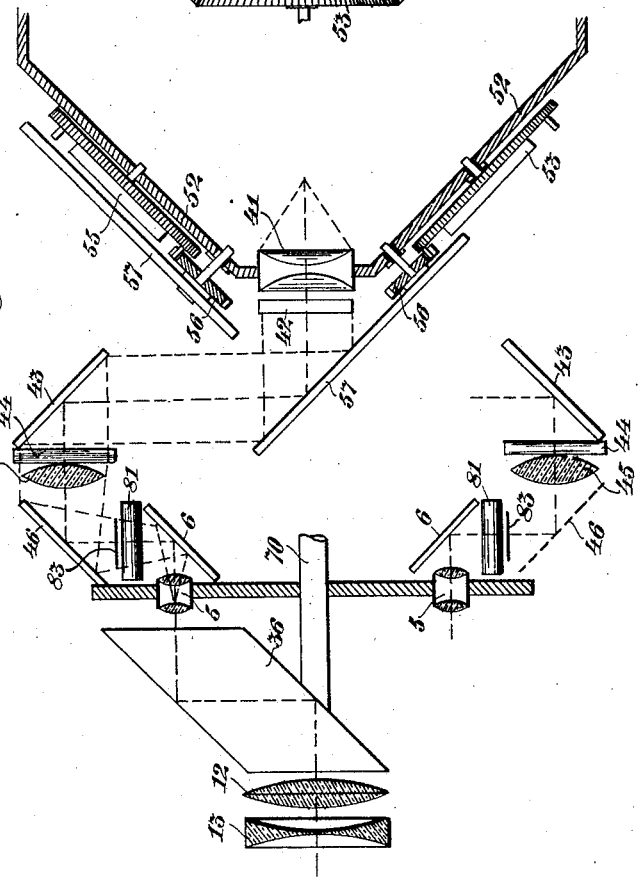

An illuminating device according to Figs. 21 and 22 serves to effect the aforesaid projection of the three colour images in groups, the condenser 41 of such device being supported by an eight-sided pyramid (Fig. 22), the opposite walls of which are arranged so as to enclose an angle of 45°. On the larger walls of the pyramid 52 four large gearing wheels 53 are fixed which are geared together by means of intermediate small pinions 54, whereby all of the wheels 53 are rotated in the same direction. In the arrangement shown in Fig. 21 pin disks 55 are secured to the wheels 54 operating the Maltese cross 56, on which a sector mirror 57 is fixed. By revolving the gear wheels 53 the sector mirrors 57 are rotated intermittently by suitably arranged pins of the pin wheel 55 in such manner that they do not interfere or meet with each other and being partially at a standstill will cast the pencil of rays of the condenser in all four directions, for example firstly upwards, then to the right, then to the centre and finally to the left towards the fixed mirror 43 and thereby illuminate the auxiliary condensers 45 and the diapositive images of the film band 83 consecutively in groups.

Since with the two forms of the apparatus according to the present invention during the projection no interruption takes place, cinematographic light images are produced which appear without any vacillation.

I claim:

1. In a cinematograph, a plurality of cameras symmetrically arranged about a common axis, a drum for a film band having a wall penetrable by light concentric with said axis, the plane of the objectives of the cameras being at an angle to said axis and said wall, and reflecting elements in the angle between said objectives and said wall, a film band on said drum, said plurality of cameras and said film band being movable, the one with respect to the other about said axis, and means to successively open and close the objectives of the cameras.

2. In a cinematograph, a plurality of cameras symmetrically arranged about a common axis, a drum for a film band having a wall penetrable by light concentric with said axis, the plane of the objectives of the cameras being at an angle to said axis and said wall, and reflecting elements in the angle between said objectives and said wall, a film band on said drum, said plurality of cameras and said film band being movable, the one with respect to the other about said axis, means to successively open and close the objectives of the cameras, and image erecting elements interposed in the path of the rays of the cameras.

3. In a cinematograph, a plurality of cameras symmetrically arranged about a common axis, a drum for a film band having a wall penetrable by light concentric with said axis, the plane of the objectives of the cameras being at an angle to said axis and said wall, and reflecting elements in the angle between said objectives and said wall, a film band on said drum, said plurality of cameras and said film band being movable, the drum being revoluble about said axis, said film band being moved by said drum, and said reflectors being movable with the drum and also arranged for independent rotation, and means to turn the said reflectors to cause the projected images to remain in fixed position.

4. In a cinematograph, a plurality of cameras symmetrically arranged about a common axis, and each having a plurality of objectives, color filters interposed in the path of the rays of the cameras, a drum for a film band having a wall penetrable by light concentric with said axis, the plane of the objectives of the cameras being at an angle to said axis and said wall, and reflecting elements in the angle between said objectives and said wall, a film band on said drum, said plurality of cameras and said film band being movable, the one with respect to the other about said axis, and means to successively open and close the objectives of the cameras.

In testimony whereof I affix my signature in presence of two witnesses.

JAN SZCZEPANIK.

Witnesses:
FRANCIUELE P. KRERIVANDOLE,
MARYAN TADEUN RUDINSLEY.